United States Patent
Yamazaki et al.

(10) Patent No.: US 7,824,815 B2
(45) Date of Patent: Nov. 2, 2010

(54) FUEL CELL SYSTEM

(75) Inventors: Daisuke Yamazaki, Ome (JP);
Toyokazu Baika, Susono (JP); Nobuo Watanabe, Susono (JP); Nobuyuki Kitamura, Minamituru-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 920 days.

(21) Appl. No.: 11/547,246

(22) PCT Filed: Apr. 7, 2005

(86) PCT No.: PCT/IB2005/000911

§ 371 (c)(1),
(2), (4) Date: Feb. 26, 2007

(87) PCT Pub. No.: WO2005/099013

PCT Pub. Date: Oct. 20, 2005

(65) Prior Publication Data

US 2007/0269695 A1 Nov. 22, 2007

(30) Foreign Application Priority Data

Apr. 8, 2004 (JP) ............................. 2004-114239

(51) Int. Cl.
*H01M 8/04* (2006.01)
(52) U.S. Cl. ..................... 429/446; 429/443; 429/513
(58) Field of Classification Search ....................... None
See application file for complete search history.

(56) References Cited

U.S. PATENT DOCUMENTS

| 7,691,508 B2 * | 4/2010 | Goebel ........................ 429/17 |
| 2001/0053469 A1 | 12/2001 | Kobayashi et al. |
| 2003/0049505 A1 | 3/2003 | Kameya et al. |
| 2003/0219636 A1 | 11/2003 | Kaufmann |

FOREIGN PATENT DOCUMENTS

| EP | 1427046 | 6/2004 |
| JP | A 5-166525 | 7/1993 |
| JP | A 8-500931 | 1/1996 |
| JP | A 2002-343398 | 11/2002 |
| JP | A 2003-173810 | 6/2003 |
| WO | WO 94/03937 | 2/1994 |

* cited by examiner

*Primary Examiner*—John S Maples
(74) *Attorney, Agent, or Firm*—Oliff & Berridge, PLC

(57) ABSTRACT

A fuel cell system (10, 200) includes an intake pipe (45, 46) that admits an introduction of oxidizing gas upstream of an oxidizing gas supply source that supplies the oxidizing gas to a fuel cell (20), and an exhaust pipe (51, 52, 221, 222) that discharges exhaust gas which contains a vapor generated at an oxygen electrode side through an operation of the fuel cell (20). The fuel cell system (10, 200) is provided with a circulating pipe (61, 62, 220) that connects the intake pipe and the exhaust pipe (51, 52, 221, 222), a circulating valve (60) that is provided in the circulating pipe and operated to adjust a flow rate of the exhaust gas supplied from the exhaust pipe (51, 52, 221, 222) to the intake pipe, and a pressure generating member that is provided in the exhaust pipe (51, 52, 221, 222) at a position at which the circulating pipe and the exhaust pipe (51, 52, 221, 222) are joined and generates a pressure that is higher than at least an atmospheric pressure.

20 Claims, 5 Drawing Sheets

FUEL CELL STACK 20

FUEL CELL SYSTEM

This application claims priority to PCT/IB2005/000911, filed Apr. 7, 2005. The disclosure of the priority application is hereby incorporated by reference herein in its entirety.

BACKGROUND OF THE INVENTION

1. Field of Invention

The invention relates to a fuel cell system which circulates exhaust gas discharged from an oxygen electrode of a fuel cell so as to be recycled.

2. Description of Related Art

A fuel cell system for generating power through an electrochemical reaction between oxidizing gas, i.e., air, and fuel gas, i.e., hydrogen requires humidification of the oxidizing gas to be supplied to the fuel cell so as to obtain a predetermined power generation efficiency. Generally in the fuel cell system, the exhaust gas that contains vapor generated by the electrochemical reaction on the oxygen electrode is circulated to the side to which the oxidizing gas is supplied as disclosed in the publication of JP-A-8-500931.

The aforementioned system adjusts the flow rate of the exhaust gas to be circulated so as to perform appropriate humidification without using a humidifying module at the side to which the oxidizing gas is supplied. The publication of JP-A-2002-343398 discloses the technology in which a bypass passage is formed such that water content within the fuel cell is removed within a short period when the operation of the fuel cell is stopped.

The aforementioned fuel cell system, as shown in FIG. 5, includes an intake pipe A upstream of a compressor that admits the oxidizing gas, an exhaust pipe B that discharges the exhaust gas from the fuel cell stack, and a connecting pipe C that connects those pipes A and B. A circulating valve V2 is provided in the connecting pipe C so as to adjust the flow rate of the exhaust gas. One end of the connecting pipe C is connected to the portion downstream of a pressure regulating valve V1 that regulates the inner pressure of the fuel cell stack. The exhaust gas from the fuel cell stack is admitted into the intake pipe A from the exhaust pipe B in the course of discharging the exhaust gas to the outside via the pressure regulating valve V1, which is used for humidification of the oxidizing gas to be supplied to the fuel cell stack.

The fuel cell system as aforementioned fails to appropriately control the flow rate of the exhaust gas to be circulated, and accordingly to adjust the humidification amount. As one end of a circulating valve V2 is connected to a portion around an outlet of the exhaust gas, the pressure at the inlet of the circulating valve V2 becomes approximately an atmospheric pressure. Accordingly the difference in the pressure between the inlet and the outlet of the circulating valve V2 becomes small, which makes it difficult to execute the appropriate flow rate control. Additionally the exhaust gas after passing through the pressure regulating valve V1 is influenced by the change in the flow rate in accordance with the request with respect to the output of the fuel cell stack, which may cause pressure fluctuation. The flow rate control of the circulating exhaust gas in consideration with the pressure fluctuation requires further complicated control of the circulating valve V2.

SUMMARY OF THE INVENTION

It is an object of the invention to provide a fuel cell system that improves controllability of the valve that circulates the exhaust gas to the intake side.

A fuel cell system according to the invention includes an intake pipe that admits an introduction of oxidizing gas upstream of an oxidizing gas supply source that supplies the oxidizing gas to a fuel cell, and an exhaust pipe that discharges exhaust gas which contains a vapor generated at an oxygen electrode side through an operation of the fuel cell. The fuel cell system is provided with a circulating pipe that connects the intake pipe and the exhaust pipe, a circulating valve that is provided in the circulating pipe and operated to adjust a flow rate of the exhaust gas supplied from the exhaust pipe to the intake pipe, and a pressure generating member that is provided in the exhaust pipe at a position at which the circulating pipe and the exhaust pipe are joined and generates a pressure that is higher than at least an atmospheric pressure.

In the fuel cell system according to the invention, the pressure generating member allows the exhaust gas at the pressure higher than the atmospheric pressure to reach the upstream side of the circulating valve. That is, the difference in the pressure between the inlet and outlet of the circulating valve is maintained to be equal to or higher than a predetermined value. This makes it possible to improve the controllability of the circulating valve. An appropriate amount of the exhaust gas is circulated so as to supply an appropriate amount of vapor to the oxidizing gas at the intake side. Accordingly the humidification amount at the intake side can be effectively adjusted.

In the above-structured fuel cell system, the pressure generating member may be formed as an exhaust gas pressure regulating valve that regulates a pressure of the exhaust gas flowing through the exhaust pipe into a predetermined pressure value.

In the above structured fuel cell system, the pressure of the exhaust gas flowing into the circulating valve is adjusted to be brought into a predetermined pressure range that is higher than the atmospheric pressure in accordance with the control range of the pressure regulating valve. Even if the pressure of the vapor containing exhaust gas discharged from the fuel cell fluctuates depending on the output, such pressure fluctuation can be restrained so as to stabilize the pressure of the exhaust gas flowing into the circulating valve. This makes it possible to improve the controllability of the circulating valve. The use of the existing pressure regulating valve allows easy pressure control of the exhaust gas flowing into the circulating valve.

In the above-structured fuel cell system, one end of the circulating pipe that circulates the exhaust gas may be connected to the exhaust pipe at a position between the fuel cell and the exhaust gas pressure regulating valve.

In the above-structured fuel cell system, a sensor that detects a pressure of the exhaust gas is provided on the exhaust pipe. The exhaust gas pressure regulating valve may be structured to electrically adjust the opening degree of the exhaust gas pressure regulating valve based on an electric signal sent from the sensor.

In the above-structured fuel cell system, the opening degree of the exhaust gas pressure regulating valve is electrically controlled based on the detected pressure of the exhaust gas. Accordingly the pressure of the exhaust gas flowing into the circulating valve can be accurately adjusted.

In the above-structured fuel cell system, the pressure generating member may be formed as a pressure regulating valve regulating a pressure within the fuel cell. Furthermore, one end of the circulating pipe that circulates the exhaust gas may be connected to the exhaust pipe at a position between the fuel cell and the pressure regulating valve.

In the above-structured fuel cell system, the exhaust gas taken from the exhaust pipe between the fuel cell and the pressure regulating valve passes through the circulating pipe so as to flow into the circulating valve. The pressure of the exhaust gas is controlled by the pressure regulating valve into a predetermined pressure value. In the fuel cell system, the piping for circulating the exhaust gas is designed such that the additional device is no longer required. This makes it possible to configure the system to improve the controllability of the circulating valve with less number of components.

In the above-structured fuel cell system, a sensor that detects a pressure of the exhaust gas is provided around the fuel cell on the exhaust pipe. The pressure regulating valve may be structured to electrically adjust the opening degree of the pressure regulating valve based on an electric signal sent from the sensor.

In the above-structured fuel cell system, the opening degree of the pressure regulating valve is electrically controlled based on the detected pressure of the exhaust gas. Accordingly the pressure of the exhaust gas flowing into the circulating valve can be accurately adjusted.

In the fuel cell system according to the invention, the pressure generating member may be formed as one of a throttle and a relief valve provided in the exhaust pipe downstream of a position at which the circulating pipe and the exhaust pipe are joined. In the fuel cell system, the exhaust gas pressure within the pipe before passing through the throttle is set to the value higher than the atmospheric pressure. Accordingly the exhaust gas at the increased pressure flows into the circulating valve, improving the controllability of the circulating valve.

In the above-structured fuel cell system, the oxygen gas supply source that supplies the oxidizing gas to the fuel cell may be provided with a compressor that introduces air from outside through the intake pipe.

In the above-structured fuel cell system, the oxidizing gas is admitted by the compressor so as to be supplied to the fuel cell, and the pressure within the intake pipe becomes negative. The difference in the pressure between the upstream and downstream of the circulating valve is increased, thus improving the controllability of the circulating valve.

In the above-structured fuel cell system, air that is introduced by the compressor is ambient air.

Another fuel cell system according to the invention includes includes an intake pipe that admits an introduction of oxidizing gas upstream of an oxidizing gas supply source that supplies the oxidizing gas to a fuel cell, and an exhaust pipe that discharges exhaust gas which contains a vapor generated at an oxygen electrode side through an operation of the fuel cell. The fuel cell is provided with a circulating pipe that connects the intake pipe and the exhaust pipe, a circulating valve that is provided in the circulating pipe and operated to adjust a flow rate of the exhaust gas supplied from the exhaust pipe to the intake pipe and a pressure generating member that is provided in the exhaust pipe and generates a pressure that is higher than a pressure within the intake pipe at a position at which the circulating pipe and the exhaust pipe are joined.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments and a modified example of the invention will be described as below.

Figure 1:
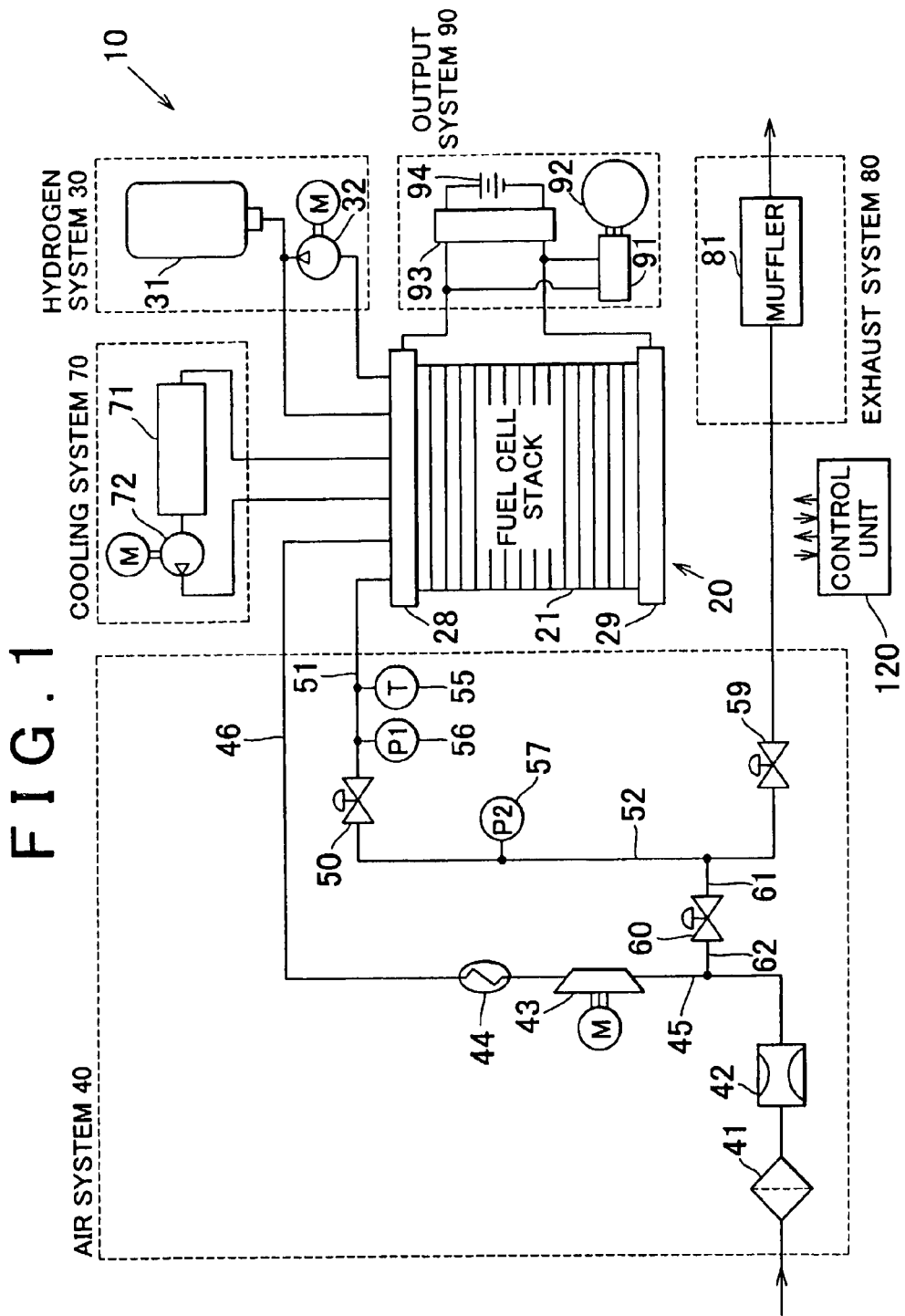
FIG. 1 is a schematic view showing a structure of a fuel cell system according to a first embodiment of the invention.

FIG. 1 is a schematic view showing a structure of a fuel cell system as a first embodiment of the invention. The system is formed as a fuel cell system 10 that generates power through the electrochemical reaction between hydrogen and oxygen, which is mounted in a vehicle driven by power generated by the fuel cell.

Referring to FIG. 1, the fuel cell system 10 is mainly formed of a fuel cell stack 20, a hydrogen system 30, an air system 40, a cooling system 70, an exhaust system 80, an output system 90, a control unit 120, and the like.

The fuel cell stack 20 includes a plurality of unit cells 21 each having a hydrogen electrode (hereinafter referred as an anode) and an oxygen electrode (hereinafter referred as a cathode), which are stacked. The stacked unit cells 21 are interposed between end plates 28, 29.

Figure 2:
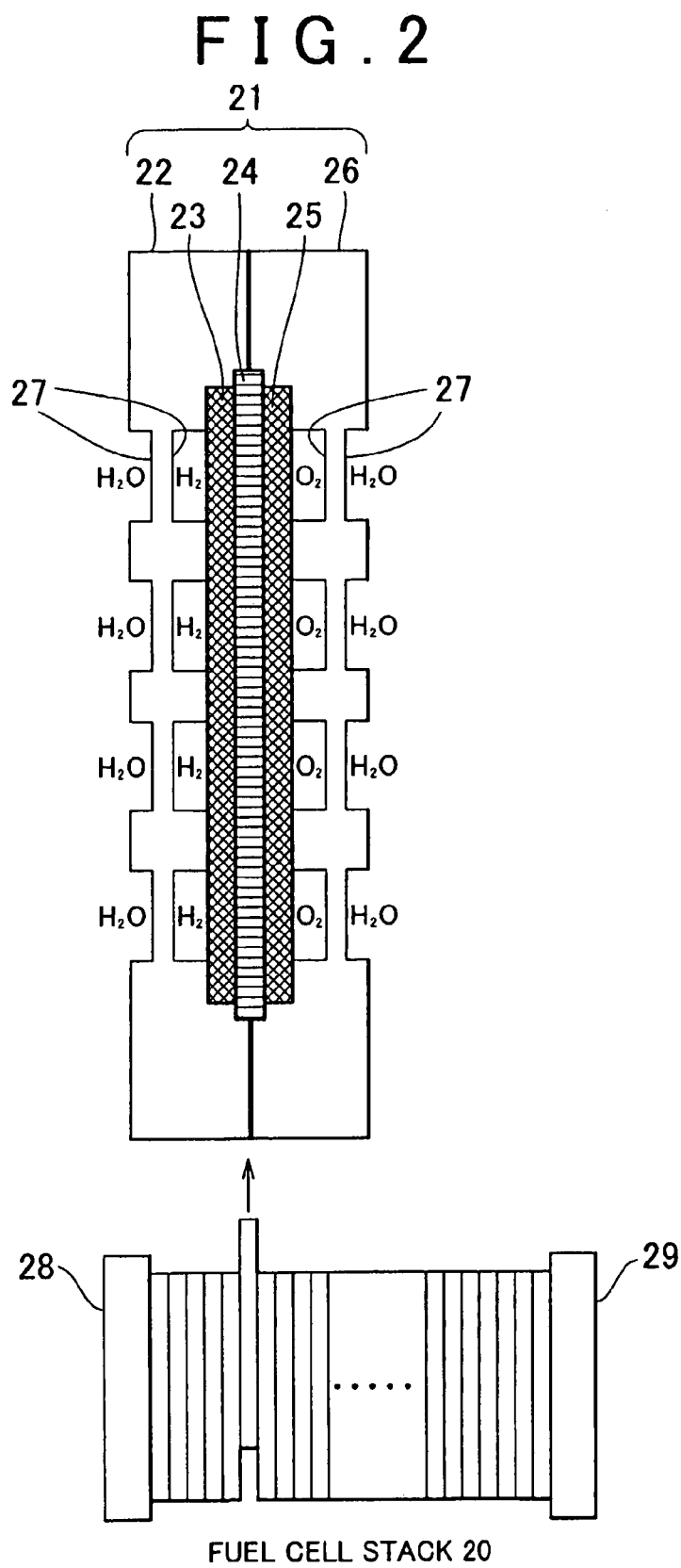
FIG. 2 is a schematic view of a unit cell.

FIG. 2 is a schematic view showing a structure of the unit cell 21. The unit cell 21 is formed by stacking a separator 22, an anode 23, an electrolyte 24, a cathode 25, and a separator 26 in sequence. The separators 22, 26 have grooves 27 each serving as a flow path which allows passage of the hydrogen gas, the oxygen gas, and the coolant therethrough. The hydrogen gas and the oxygen gas are supplied to the anode 23 and the cathode 25 via the grooves 27, respectively.

The hydrogen gas supplied to the anode 23 reacts with a catalyst on a catalytic layer that constitutes the anode 23 to generate a hydrogen ion. The hydrogen ion permeates the electrolyte 24 and reacts with oxygen contained in the oxygen gas on the cathode 25. Electric power is generated in the unit cell 21 through the electrochemical reaction as aforementioned. The fuel cell stack 20 is formed by a plurality of unit cells 21 in series so as to output high power. In the embodiment, Nafion®, a product of a solid polymer membrane is employed as the electrolyte membrane 24. The electrolyte membrane 24 functions well in a wet state.

The end plate 28 includes an inlet port through which various types of fluid such as the hydrogen gas, oxidizing gas, coolant is supplied into the fuel cell stack 20, and an outlet port through which the fluid is discharged outside. Those ports are connected to the respective pipes. The various types of fluid supplied through the inlet port is appropriately supplied to the grooves 27 of the unit cells 21 such that the electrochemical reaction progresses smoothly. In the embodiment, air is used as the oxidizing gas, and cooling water is used as the coolant, respectively.

The hydrogen system 30 is formed of a hydrogen tank 31, a hydrogen circulating pump 32, piping, and the like as shown in FIG. 1, which is connected to the end plate 28 of the fuel cell stack 20 via the piping. The pressure and the flow rate of the hydrogen gas at high pressure stored in the hydrogen tank 31 are adjusted by a valve (not shown) so as to be supplied into the fuel cell stack 20. It is possible to reform methane, methanol and the like to generate hydrogen so as to be supplied instead of the hydrogen gas supplied from the hydrogen tank 31.

The hydrogen gas discharged from the fuel cell stack 20 is recirculated thereto again by a hydrogen circulating pump 32.

This makes it possible to effectively use the discharged hydrogen gas that has not been subjected to the electrochemical reaction.

The air system 40 is mainly formed of an intake line that supplies air to the fuel cell stack 20, an exhaust line that discharges air from the fuel cell stack 20, and a circulating line that circulates air from the exhaust line to the intake line.

The intake line is formed of an air cleaner 41, an air flow meter 42, an air compressor 43, an intercooler 44 and intake pipes 45, 46 that connects the aforementioned equipment in the order from the upstream of the flow of air supplied to the fuel cell stack 20. The intake line is connected to the end plate 28 of the fuel cell stack 20 via the intake pipe 46.

Air introduced from the outside is cleaned through the air cleaner 41, passes through the air flow meter 42, and is compressed by the air compressor 43. Such air then is cooled by the intercooler 44 so as to be supplied to the fuel cell stack 20. The air compressor 43 is driven by a motor such that air is introduced in accordance with the rotating speed of the motor. The pressure within the intake pipe 45 becomes negative upon introduction of air as aforementioned.

The air flow meter 42 detects a flow rate of air introduced from the outside. The flow rate of the introduced air is output to the control unit 120 that controls operations of the fuel cell stack 20, based on which the motor of the air compressor 43 is controlled.

Meanwhile the exhaust line is formed of a pressure regulating valve 50, an exhaust gas pressure regulating valve 59, exhaust pipes 51, 52 that connect the aforementioned equipment and the like in the order from the upstream of the flow of air (referred as the cathode exhaust gas) discharged from the fuel cell stack 20. The exhaust line is connected to the end plate 28 of the fuel cell stack 20 via the exhaust pipe 51.

The cathode exhaust gas discharged from the fuel cell stack 20 is discharged from a muffler 81 of the exhaust system 80 through the pressure regulating valve 50, exhaust gas pressure regulating valve 59, and exhaust pipes 51, 52 that connect those valves.

The pressure regulating valve 50 has its opening degree controlled so as to adjust the pressure of air to be supplied to the fuel cell stack 20. The exhaust gas pressure regulating valve 59 adjusts the pressure of the exhaust pipe 52 that fluctuates in accordance with the operation request so as to be brought into a predetermined range. A poppet valve may be employed for the pressure regulating valve 50 and the exhaust gas pressure regulating valve 59 such that the opening degree of the valve is adjusted by advancing or retarding the poppet. The control of the opening degree of the valve as aforementioned can be made by controlling the rotating angle of the motor for driving the poppet valve.

The exhaust pipe 51 is provided with a temperature sensor 55, a pressure sensor 56, and the exhaust pipe 52 is provided with the pressure sensor 57, respectively. The electric signals from those sensors are output to the control unit 120 for controlling various kinds of valves.

The circulating line is formed of a circulating valve 60, and circulating pipes 61, 62. The circulating pipe 61 connects the exhaust pipe 52 and the circulating valve 60, and the circulating pipe 62 connects the circulating valve 60 and the intake pipe 45, respectively. The cathode exhaust gas discharged from the fuel cell stack 20 passes through the exhaust pipe 52 via the pressure regulating valve 50, and flows into the exhaust gas pressure regulating valve 59. Then all or part of the cathode exhaust gas flows into the circulating valve 60 through the exhaust pipe 52 and the circulating pipe 61.

The circulating valve 60 regulates the flow rate of the cathode exhaust gas by adjusting its opening degree such that the cathode exhaust gas at the predetermined flow rate is supplied to the intake pipe 45 through the circulating pipe 62. In the cathode 25 within the fuel cell stack 20, water (vapor) is generated by the electrochemical reaction. Accordingly the discharged cathode exhaust gas contains vapor, and thus, is in the wet state. The circulating valve 60 supplies air in the wet state to the intake pipe 45. The poppet valve is employed as the circulating valve 60 in the embodiment of the invention.

The air compressor 43 admits both air in wet state supplied through the circulating valve 60 and air newly supplied from outside to be introduced therein so as to be further supplied to the fuel cell stack 20 as humidified air. The circulating valve 60 directly controls the flow rate of the circulating cathode exhaust gas such that an amount of humidified air supplied to the fuel cell stack 20 is controlled. The fuel cell system 10 of this embodiment is not provided with a humidifying module for air humidification in the intake line.

The cooling system 70 is formed of a radiator 71, a pump 72, and a pipe that connects the radiator 71 and the pump. 72. The end plate 28 of the fuel cell stack 20 is connected to the cooling system 70 via the pipe. The electrochemical reaction in the fuel cell stack 20 generates heat which increases the temperature therein. The cooling water that flows into the fuel cell stack 20 to restrain the temperature rise therein is cooled by the radiator 71, and then circulated by the pump 72.

The exhaust system 80 is provided with the muffler 81 connected to the air system 40 such that the exhaust gas from the fuel cell stack 20 is discharged to the outside of the fuel cell system 10. In the course of circulating the hydrogen gas that contains nitrogen components through a hydrogen circulating pump 32, highly concentrated nitrogen gas is generated. The exhaust system 80 is also connected to the hydrogen system 30, which is not shown in the drawing. The thus generated nitrogen is diluted in the hydrogen system 30 so as to be discharged to the outside at a predetermined timing.

The output system 90 is formed of an inverter 91, a motor 92 for a vehicle operation, a DC/DC converter 93, a secondary battery 94, and the like. Electric power generated by the electrochemical reaction between hydrogen gas and air supplied to the fuel cell stack 20 is used for driving the motor 92 for operating the vehicle via the inverter 91. A surplus of the electric power generated upon normal running or deceleration of the vehicle can be stored in the secondary battery 94 via the DC/DC converter 93.

Figure 3:
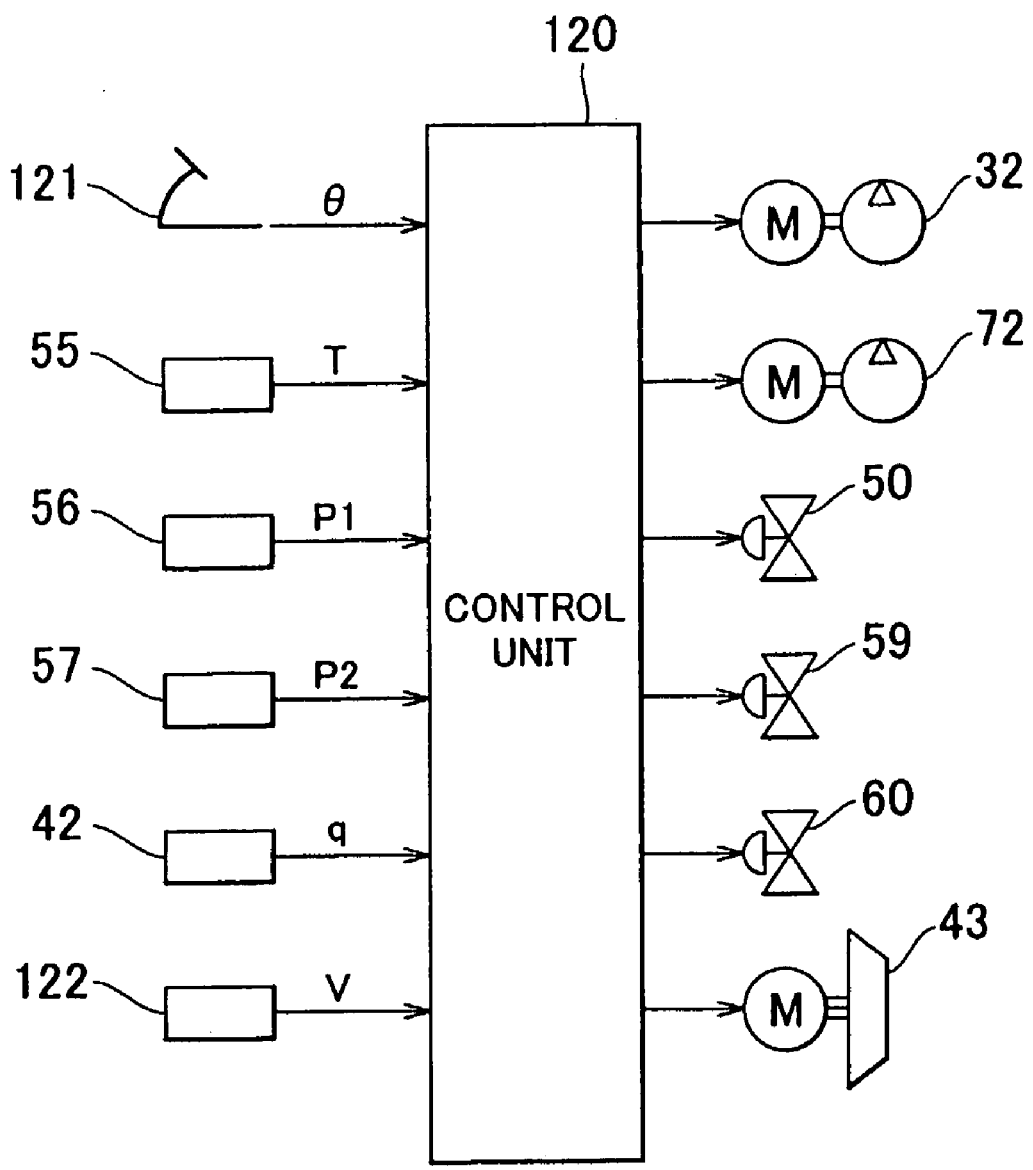
FIG. 3 is a block diagram showing signals input to and output from a control unit of the fuel cell system.

The control unit 120 serves to control various valves, motors, pumps of the above-structured fuel cell system 10. FIG. 3 is a block diagram that represents signals input to and output from the control unit 120.

Referring to FIG. 3, based on signals received from various sensors, the control unit 120 determines the operation state of the vehicle, and outputs signals for controlling the actuator.

More specifically, the control unit 120 receives signals indicating pressures P1, P2, temperature T, air flow rate q, accelerator opening θ, vehicle speed V and the like from the pressure sensors 56, 57, the temperature sensor 55, the air flow meter 42, the accelerator position sensor 121, the vehicle speed sensor 122 and the like, respectively, based on which the required output (electric power) is calculated so as to operate the fuel cell system 10 by controlling the air compressor 43, the pressure regulating valve 50, the circulating valve 60, exhaust gas pressure regulating valve 59, the hydrogen circulating pump 32, the pump 72 and the like.

The control unit 120 controls the humidification amount serving as the humidifying module that is not provided in the fuel cell system 10 according to the invention. More specifically the control unit 120 calculates the humidification amount required for the air supply line so as to control the opening degree of the circulating valve 60. When it is determined that the humidification amount is insufficient for the required amount, for example, the control unit 120 increases the opening degree of the circulating valve 60. Meanwhile when it is determined that the humidification amount is excessive for the required amount, the control unit 120 decreases the opening degree of the circulating valve 60.

The humidification amount may be calculated based on the detection values including outputs such as current value, and voltage value of the fuel cell stack 20 (not shown), the temperature T detected by the temperature sensor 55, the flow rate q detected by the air flow meter 42, the intake air amount derived from the motor rotating speed of the air compressor 43, and a predetermined map of water content. The circulating flow rate of the cathode exhaust gas corresponding to the required humidification amount is determined based on the calculated water content so as to determine the opening degree of the circulating valve 60.

During operation of the fuel cell system 10 according to the first embodiment, when it is determined by the control unit 120 that the power generation amount of the fuel cell stack 20 has been increased based on the operation state, the air supply quantity is increased by the air system 40 for the purpose of increasing the reaction speed. More specifically, the control unit 120 executes the control for increasing the rotating speed of the motor of the air compressor 43.

Upon increase in the rotating speed of the air compressor 43, the flow rate of the supplied air is increased, and the pressures within the fuel cell stack 20, the exhaust pipe 51 and the like are increased. The pressure sensor 56 provided in the exhaust pipe 51 detects the pressure value P1 that has been increased. Receiving the electric signal from the pressure sensor 56, the control unit 120 executes the control of reducing the pressure value P1 by increasing the opening degree of the pressure regulating valve 50 for the purpose of keeping the pressure within the fuel cell stack 20 substantially constant.

Upon increase in the opening degree of the pressure regulating valve 50, the flow rate of the cathode exhaust gas in the exhaust pipe 52 is increased to raise the pressure therein. The pressure sensor 57 provided in the exhaust pipe 52 detects the pressure value P2 that has been increased. Receiving the electric signal from the pressure sensor 57, the control unit 120 executes the control of decreasing the pressure value P2 by increasing the opening degree of the exhaust gas pressure regulating valve 59 for the purpose of keeping the pressure within the exhaust pipe 52 within a predetermined range.

When it is determined by the control unit 120 that the electric power generated by the fuel cell stack 20 has been decreased during the operation of the fuel cell system 10, the control for decreasing the rotating speed of the motor of the air compressor 43 is executed.

As the rotating speed of the air compressor 43 is decreased, the pressure within the exhaust pipe 51 decreases. The control unit 120 executes the control of increasing the pressure value P1 that has been decreased by reducing the opening degree of the pressure regulating valve 50 based on the pressure value P1 of the pressure sensor 56.

As the opening degree of the pressure regulating valve 50 is decreased, the pressure of the exhaust pipe 52 decreases. The control unit 120 executes the control of increasing the pressure value P2 that has been decreased by reducing the opening degree of the exhaust gas pressure regulating valve 59 based on the pressure value P2 of the pressure sensor 57.

The control unit 120 executes a series of control of the valves as described above so as to keep each pressure in the exhaust pipes 51, 52 substantially constant. That is, the pressure fluctuation in the cathode exhaust gas caused by the change in the request with respect to the output of the fuel cell is restrained by controlling the exhaust gas pressure regulating valve 59 such that the pressure within the exhaust pipe 52 is controlled into a predetermined range.

The cathode exhaust gas within the exhaust pipe 52 at the pressure controlled to be in the predetermined range flows into the circulating valve 60 via the circulating pipe 61 in the circulating line. The pressure of the cathode exhaust gas upstream of the circulating valve 60 is constantly maintained within the predetermined range. The circulating valve 60 upstream of which has the cathode exhaust gas kept at a constant pressure serves to supply a predetermined quantity of the cathode exhaust gas to the intake pipe 45.

In the fuel cell system according to the first embodiment, in spite of the pressure fluctuation in the cathode exhaust gas within the exhaust pipe 52, such fluctuation can be restrained by adjusting the opening degree of the exhaust gas pressure regulating valve 59. Additionally the pressure within the exhaust pipe 52 (within the circulating pipe 61) is controlled to a predetermined value that is higher than the atmospheric pressure by the exhaust gas pressure regulating valve 59 so as to increase the difference in the pressure between the upstream and downstream of the circulating valve 60. This makes it possible to supply the cathode exhaust gas at the stabilized pressure to the upstream side of the circulating valve 60 so as to improve controllability of the circulating valve 60. Thus, the appropriate amount of vapor can be supplied to air at the intake side.

The valve of poppet type is employed for the pressure regulating valve 50, the exhaust gas pressure regulating valve 59, and the circulating valve 60. However, the valve of a butterfly type may be employed. It is also possible to use solenoid for driving the poppet. In this case, the duty control may be executed so as to drive (On-Off operation) the valve body repeatedly at a predetermined cycle.

In the first embodiment, the exhaust gas pressure regulating valve 59 is controlled based on the pressure value P2 of the pressure sensor 57. However, such control may be executed based on the pressure value P1 of the pressure sensor 56. It is also possible to output the control command to the exhaust gas pressure regulating valve 59, which is equivalent to the one output from the control unit 120 to the pressure regulating valve 50. In either case, the existing process for controlling the fuel cell system allows the pressure control of the exhaust pipe 52 to be brought into a predetermined range.

In the first embodiment, the exhaust gas pressure regulating valve 59 is used for controlling the pressure of the cathode exhaust gas that flows into the circulating valve 60. It is also possible to provide a throttle in the pipe instead of the exhaust gas pressure regulating valve 59. In this case, the pressure of the cathode exhaust gas that flows through the circulating pipe 61 is controlled to be higher than that of the cathode exhaust gas in the exhaust system 80. That is, the throttle with a predetermined size can increase the difference in the pressure between the circulating pipes 61 and 62 so as to improve the controllability of the circulating valve 60.

Figure 4:
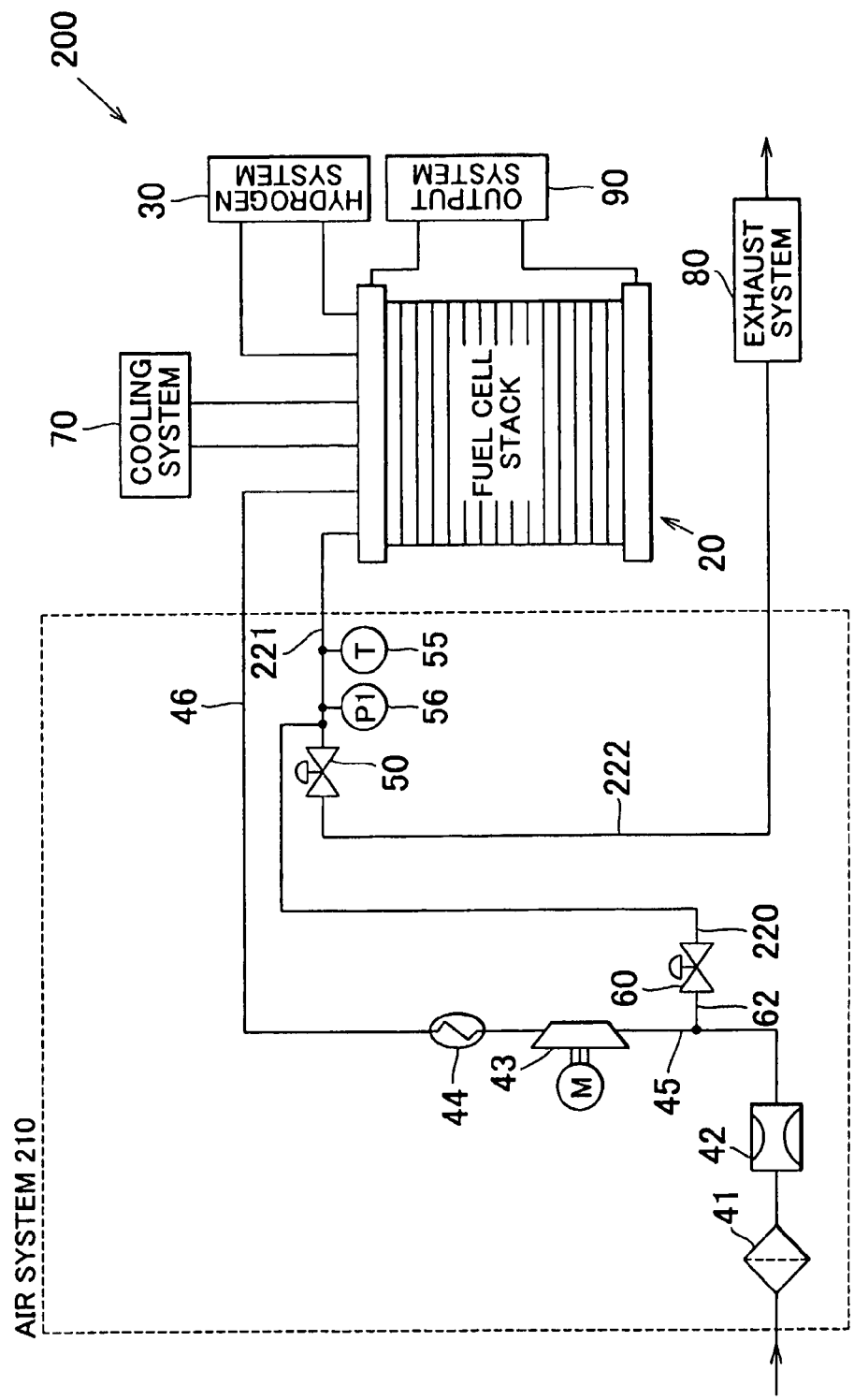
FIG. 4 is a schematic view showing a structure of a fuel cell system according to a second embodiment of the invention.
Figure 5:
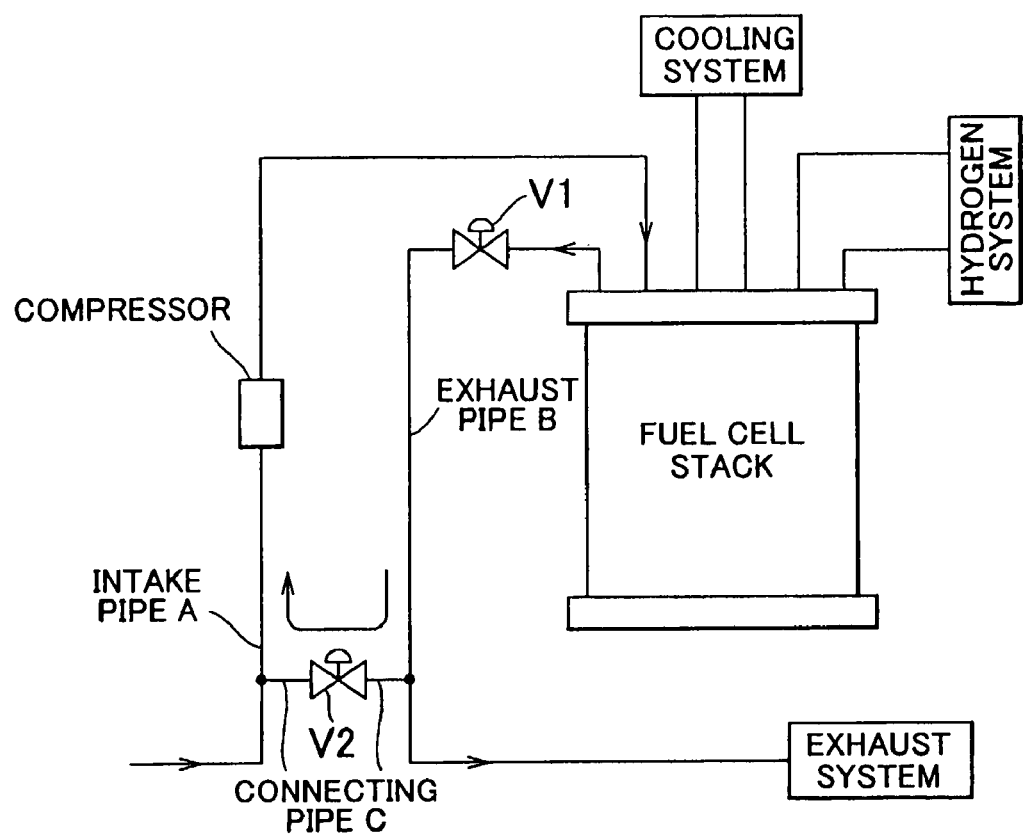
FIG. 5 is a schematic view of a fuel cell system as related art.

FIG. 4 is a schematic view of a fuel cell system as a second embodiment of the invention. Referring to FIG. 4, a fuel cell system 200 is mainly formed of a fuel cell stack 20, a hydrogen system 30, an air system 210, a cooling system 70, an exhaust system 80, an output system 90 and the like.

The fuel cell system 200 according to the second embodiment is the same as the fuel cell system 10 according to the first embodiment except a part of the air system 210. The components of the fuel cell system 200 other than the part of the air system 210 will be designated as the same reference numerals as those of the first embodiment, and explanation thereof, thus, will be omitted. The fuel cell system 200 includes the control unit (not shown) that controls various actuators, which is the same as in the first embodiment.

Referring to FIG. 4, the air system 210 is formed of the intake line, the exhaust line, and the circulating line similar to those described in the first embodiment. The exhaust line includes a temperature sensor 55, an exhaust pipe 221 having a pressure sensor 56 therein, a pressure regulating valve 50 for regulating the pressure within the fuel cell stack 20, and an exhaust pipe 222 that leads the cathode exhaust gas through the pressure regulating valve 50 to the exhaust system 80. The exhaust pipes 221, 222 correspond with the exhaust pipes 51, 52 of the fuel cell system 10 according to the first embodiment as shown in FIG. 1, which exhibit the same functions. The exhaust line of the second embodiment is different from that of the first embodiment in that the exhaust gas pressure regulating valve is not provided.

The circulating line is formed of a circulating valve 60, circulating pipes 62, 220 and the like. The circulating line of the second embodiment is equivalent to that of the first embodiment in the point that the cathode exhaust gas flowing through the exhaust line is circulated to the intake line. However, in the second embodiment, the position at which the circulating pipe 220 connected to the circulating valve 60 is joined with the exhaust line is different from that of the first embodiment.

The circulating pipe 220 has one end connected to the exhaust pipe 221 such that the cathode exhaust gas between downstream of the fuel cell stack 20 and upstream of the pressure regulating valve 50 is supplied to the circulating valve 60. The pressure of the cathode exhaust gas within the exhaust pipe 221 is maintained at substantially constant by the pressure regulating valve 50 that executes the pressure control.

In the fuel cell system 200 of the second embodiment, the pressure of the cathode exhaust gas flowing through the exhaust pipe 221 between the downstream of the fuel cell stack 20 and the upstream of the pressure regulating valve 50 is maintained at a predetermined value by the pressure regulating valve 50 that executes the pressure control. Accordingly, the system for improving the controllability of the circulating valve 60 can be formed with less components.

As the embodiments of the invention have been described, it is to be understood that the invention is not limited to the aforementioned embodiments, and that the invention may be formed into various forms without departing from the scope of the invention.

The fuel cell system of the first embodiment is structured to regulate the pressure upstream of the circulating valve 60 using the exhaust gas pressure regulating valve 59. It is also possible to employ a relief valve instead of the exhaust gas pressure regulating valve 59. The use of the device serving as the resistance in the flow path may set the pressure upstream of the circulating valve 60 to the value equal to or greater than the pressure loss (atmospheric pressure, for example) owing to the resistance in the pipe of the exhaust system 80. Thus, the pressure increase caused by the output fluctuation of the fuel cell stack 20 can be restrained into a predetermined range by the use of the relief valve.

The invention claimed is:

1. A fuel cell system, comprising:
    a fuel cell;
    an intake pipe for admitting an introduction of oxidizing gas;
    an oxidizing gas moving source that is provided downstream of the intake pipe for moving the oxidizing gas to a fuel cell;
    an exhaust pipe for discharging exhaust gas which contains vapor generated at an oxygen electrode side of the fuel cell through an operation of the fuel cell;
    a circulating pipe that connects the intake pipe and the exhaust pipe;
    a circulating valve that is provided in the circulating pipe for adjusting a flow rate of the exhaust gas supplied from the exhaust pipe to the intake pipe,
    a pressure regulating valve that is provided in the exhaust pipe for regulating a pressure at a position at which the circulating pipe and the exhaust pipe are joined; and
    a control unit for controlling the pressure regulating valve to regulate the pressure at the position at which the circulating pipe and the exhaust pipe are joined into a predetermined pressure value higher than a pressure within the intake pipe.

2. The fuel cell system according to claim 1, wherein the control unit controls the pressure regulating valve to regulate the pressure at the position at which the circulating pipe and the exhaust pipe are joined to be higher than at least an atmospheric pressure.

3. The fuel cell system according to claim 1, wherein the control unit controls the pressure regulating valve to regulate a pressure of the exhaust gas flowing through the exhaust pipe.

4. The fuel cell system according to claim 2, wherein the control unit controls the pressure regulating valve to regulate a pressure of the exhaust gas flowing through the exhaust pipe.

5. The fuel cell system according to claim 3, wherein one end of the circulating pipe that circulates the exhaust gas is connected to the exhaust pipe at a position between the fuel cell and the pressure regulating valve.

6. The fuel cell system according to claim 4, wherein one end of the circulating pipe that circulates the exhaust gas is connected to the exhaust pipe at a position between the fuel cell and the pressure regulating valve.

7. The fuel cell system according to claim 3, further comprising a sensor that is provided in the exhaust pipe for detecting a pressure of the exhaust gas, wherein the control unit electrically regulates an opening degree of the pressure regulating valve based on an electric signal output from the sensor.

8. The fuel cell system according to claim 4, further comprising a sensor that is provided in the exhaust pipe for detecting a pressure of the exhaust gas, wherein the control unit electrically regulates an opening degree of the pressure regulating valve based on an electric signal output from the sensor.

9. The fuel cell system according to claim 5, further comprising a sensor that is provided in the exhaust pipe for detecting a pressure of the exhaust gas, wherein the control unit electrically regulates an opening degree of the pressure regulating valve based on an electric signal output from the sensor.

10. The fuel cell system according to claim 6, further comprising a sensor that is provided in the exhaust pipe for detecting a pressure of the exhaust gas, wherein the control unit electrically regulates an opening degree of the pressure regulating valve based on an electric signal output from the sensor.

11. The fuel cell system according to claim 1, wherein the control unit controls the pressure regulating valve to regulate a pressure within the fuel cell.

12. The fuel cell system according to claim 2, wherein the control unit controls the pressure regulating valve to regulate a pressure within the fuel cell.

13. The fuel cell system according to claim 11, wherein one end of the circulating pipe that circulates the exhaust gas is connected to the exhaust pipe at a position between the fuel cell and the pressure regulating valve.

14. The fuel cell system according to claim 12, wherein one end of the circulating pipe that circulates the exhaust gas is connected to the exhaust pipe at a position between the fuel cell and the pressure regulating valve.

15. The fuel cell system according to claim 11, further comprising a sensor that is provided in the exhaust pipe at a position close to the fuel cell for detecting a pressure of the exhaust gas, wherein the control unit electrically regulates an opening degree of the pressure regulating valve based on an electric signal output from the sensor.

16. The fuel cell system according to claim 12, further comprising a sensor that is provided in the exhaust pipe at a position close to the fuel cell for detecting a pressure of the exhaust gas, wherein the control unit electrically regulates an opening degree of the pressure regulating valve based on an electric signal output from the sensor.

17. The fuel cell system according to claim 13, further comprising a sensor that is provided in the exhaust pipe at a position close to the fuel cell for detecting a pressure of the exhaust gas, wherein the control unit electrically regulates an opening degree of the pressure regulating valve based on an electric signal output from the sensor.

18. The fuel cell system according to claim 14, further comprising a sensor that is provided in the exhaust pipe at a position close to the fuel cell for detecting a pressure of the exhaust gas, wherein the control unit electrically regulates an opening degree of the pressure regulating valve based on an electric signal output from the sensor.

19. The fuel cell system according to claim 1, wherein the oxygen gas supply source is provided with a compressor that introduces air from outside through the intake pipe.

20. The fuel cell system according to claim 19, wherein the air that is introduced by the compressor is ambient air.

\* \* \* \* \*